United States Patent [19]

Moerk, Jr.

[11] 4,400,000
[45] Aug. 23, 1983

[54] HEAD GASKET ASSEMBLY FOR DIESEL ENGINES

[75] Inventor: John C. Moerk, Jr., Buffalo Grove, Ill.

[73] Assignee: Felt Products Mfg. Co., Skokie, Ill.

[21] Appl. No.: 368,564

[22] Filed: Apr. 15, 1982

[51] Int. Cl.³ .............................................. F16J 15/12
[52] U.S. Cl. ................................ 277/235 B; 277/166
[58] Field of Search ................. 277/235 B, 166, 167.3, 277/168

[56] References Cited

U.S. PATENT DOCUMENTS

| | | | |
|---|---|---|---|
| 1,819,694 | 8/1931 | Sperry | 277/235 |
| 1,843,297 | 2/1932 | Oven | 277/235 B |
| 1,847,729 | 3/1932 | Shaw | 277/235 R |
| 1,928,585 | 9/1933 | Balfe | 277/235 B |
| 3,565,449 | 2/1971 | Ascencio et al. | 277/235 B |
| 4,311,318 | 1/1982 | Czernik et al. | 277/235 B |

*Primary Examiner*—Robert I. Smith
*Attorney, Agent, or Firm*—Dressler, Goldsmith, Shore, Sutker & Milnamow, Ltd.

[57] ABSTRACT

An improved head gasket assembly for sealing the block and head of an internal combustion engine where the head mounts a precombustion chamber, and method of making that gasket assembly. The gasket assembly comprises a main gasket body and an armored fire ring mounted at the combustion openings. The fire ring provides a precombustion tab underlying the precombustion chamber, against which sealing occurs. To enhance that seal, an auxiliary sealing element is positioned between the wire ring and the precombustion tab. The auxiliary element includes a main body portion which lies along the periphery of the precombustion chamber and sealing tabs which bridge the zones of intersection of the chamber and the wire ring so that when the gasket assembly is compressed between the block and the head and precombustion chamber, the auxiliary sealing element induces a more effective and consistent seal between the head and precombustion chamber, and the associated fire ring and main gasket body, regardless of whether the precombustion chamber is flush with, projects from, or is recessed with respect to, the head.

6 Claims, 8 Drawing Figures

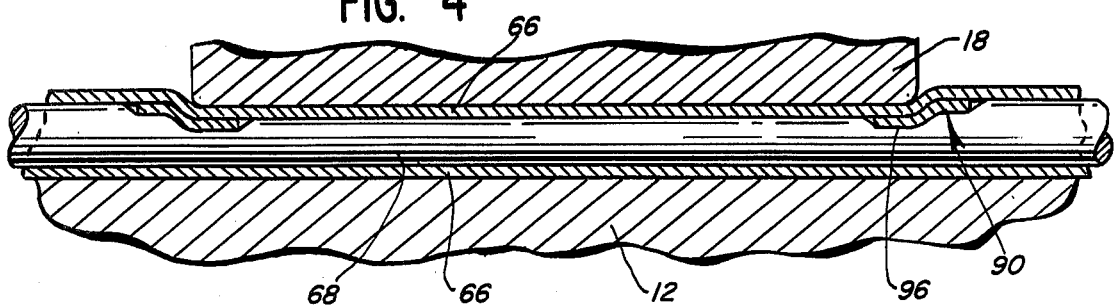
FIG. 4
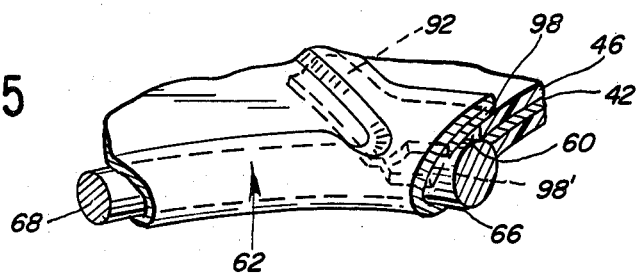
FIG. 5
FIG. 6
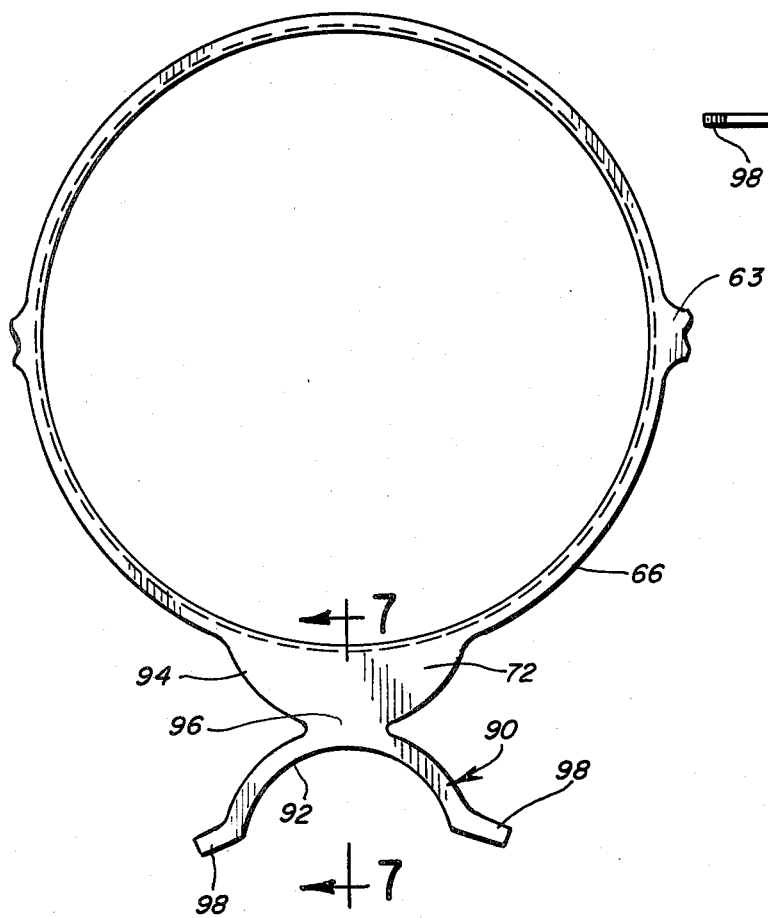
FIG. 7
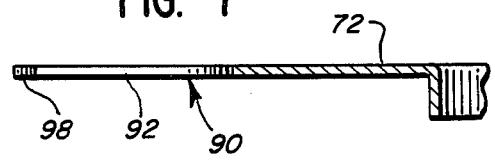
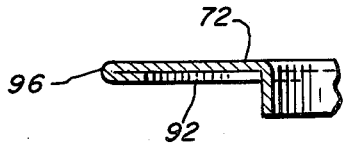
FIG. 8

HEAD GASKET ASSEMBLY FOR DIESEL ENGINES

TECHNICAL FIELD

This invention relates to improvements in internal combustion head gaskets, and particularly to high-compression diesel engine head gaskets.

BACKGROUND OF THE INVENTION

There are a variety of head gaskets known in the prior art. Head gaskets generally comprise thin flat bodies which define a plurality of apertures, including oil and water openings and cylinder openings.

In high-compression diesel engines operating at high temperatures and high pressures, it has been a practice for a number of years now to provide head gaskets with armoring adjacent the cylinder or combustion openings to seal the cylinder openings and to protect the remainder of the gasket from the effects of the high temperature and pressure. Early armoring covered the entire gasket surface as well as the cylinder openings, as typified by U.S. Pat. No. 1,819,694.

It was found subsequently that armor embracing the edges of the gasket body adjacent the cylinder opening was sufficient to protect the gasket and to seal the head and block at the cylinder bore. Further, armor of this general type has been provided with attaching sections and such a construction is illustrated in British Patent Specification No. 1,441,505. It has also been suggested that head gasket armor be positioned in a combustion opening and be suspended from tabs which project outwardly of the combustion opening and into engagement with the gasket body, and a head gasket of this type is illustrated in U.S. Pat. No. 3,565,449.

More recently, diesel engines have been introduced into automobiles in increasing numbers. In typical diesel engines used in the United States, it has become a practice to provide a precombustion chamber for each cylinder bore which feeds fuel into the cylinder bore and to position that precombustion chamber (frequently referred to as a pre-cup) in the head and straddling the armoring. To insulate the gasket, to effect a seal, and to provide a seal for the pre-cup, a conventional diesel gasket, such as of the type shown in U.S. Pat. No. 3,565,449, has been used with an expansive tab (a pre-cup or precombustion tab) extending from the armor and outwardly over the main gasket body. Such a tab is illustrated in U.S. Pat. No. 4,311,318.

It was found that pre-cup tab modified gaskets tended to permit blow-by, especially when the engine was cold, and as a result, the associated gaskets too frequently failed. Worse, the blow-by sometimes communicated with the oil and water ports, causing blow-out of the oil or water, the cooling media for the engine, which sometimes caused the engine itself to burn out.

It was determined that one of the possible reasons for the failure of the head and pre-cup to be sealed by the armoring, as a head without a pre-cup will usually do, is the discontinuity at the intersection between the head and pre-cup where it crosses or intersects the armor in the zone in which the wire of the armor underlies the armor sheath. For example, if the pre-cup projects beyond the plane of the head, then at the intersection with the wire, the wire is placed under a greater compressive load by the pre-cup than by the head. As a result, at the intersection there is a zone which may not force the ensheathing armor into sealing engagement with the head, the projecting edge of the pre-cup and then the pre-cup bottom surface. The same result could occur if the pre-cup was recessed, or if there was a significant chamfer at the surface of the bore receiving the pre-cup. In that case there would be a zone in which the armor did not adequately seal the confronting head and pre-cup surfaces, and therefore there would be provided a possible path for the escape of high pressure gases from the combustion cylinder, with the attendant damage these gases could inflict.

One solution to the problem was to grind the faces of the pre-cup and head to a common plane and to make absolutely certain there is no chamfer at the head or pre-cup surface. However, that is impractical and expensive, and is not within the control of gasket manufacturers. Another solution was to assemble parts so that they were absolutely flush. However, that is not a practical solution either, for tolerances of even several thousandths of an inch could not be permitted and holding to zero tolerances for pairs of mass-produced assembled parts is extremely difficult and exceedingly expensive.

Neither was it possible simply to increase the head load or to use a thicker or softer wire ring because available head loads are limited, are normally used up to their maximum in engines of the type under consideration, and the load distribution in the zones of the armor and main body of the gasket are calculated, determined and balanced by design. To substantially increase the portion of the load taken up in the area of the armor would reduce the load availabe in the main body and would then tend to permit leakage there.

One practical solution was found to be the addition of spanner means underlying one of the legs of the armor at each of the two spaced zones of intersection of the pre-cup and the armor, so that when the gasket assembly was disposed between the head and block, and was placed under load, a more effective and consistent seal between the armor adjacent the precombustion tab and the head, and a precombustion chamber was obtained. That solution is disclosed in U.S. Pat. No. 4,311,318 wherein spanner means may be integrally formed with the metallic armor annulus and may be reversely folded to underlie the wire ring, and wherein the spanner means preferably comprises a pair of reversely folded spaced spanner elements which are integrally formed with the metallic annulus and which are preferably disposed between the annulus leg spaced away from the precombustion tab and the wire ring.

SUMMARY OF THE INVENTION

In accordance with the present invention, an improved head gasket assembly is provided for effectively sealing diesel engines, all without significantly interfering with the basic gasket construction, load distribution and manufacturing procedures.

The head gasket comprises a multi-layered main gasket body and defines at least one combustion opening adapted to be disposed in-line with the associated cylinder, and a plurality of other apertures spaced away from the combustion opening. An armor or ring fire ring is secured to the main gasket body adjacent the periphery of the combustion opening. The fire ring comprises a metallic annulus having legs lying generally parallel to the main gasket body, a wire ring disposed between the legs and within the periphery of the combustion opening, and a precombustion tab extending from one of the legs outwardly of the combustion opening. The tab is adapted to underlie and support the precombustion chamber so that the precombustion chamber partially overlies the combustion opening. The precombustion chamber overlies and intersects the wire ring at two spaced zones of intersection.

In accordance with the present invention, the combustion tab is provided with a peripheral auxiliary sealing element which underlies the pre-cup tab along its periphery. The sealing element terminates at each of its ends in an extension or tab which bridges a zone of intersection and which extends along a portion of a leg of the annulus. Preferably, the auxiliary sealing element is integral with the precombustion tab and is folded under the pre-cup tab so that the extension tabs lie between the precombustion tab and the associated annulus leg, and the wire ring. The periphery of the precombustion chamber bears against the precombustion tab over the auxiliary sealing element.

The improved head gasket assembly thereby provides a highly effective seal around the precombustion chamber, even when the pre-cup surface may be offset vertically from the plane of the engine head. The auxiliary sealing element provides for an increase of sealing stress around the perimeter of the precombustion chamber, thereby reducing the possibility of combustion gas leakage. The positioning of the auxiliary sealing element over the wire, i.e., between the pre-cup tab and wire, further enhances the sealing effect, thereby to minimize the possibility of blow-by.

Further objects, features and advantages of this invention will become apparent from the following description and drawings showing a presently preferred embodiment, of which:

BRIEF DESCRIPTION OF THE DRAWINGS

FIG. 4 is an enlarged cross-sectional view taken substantially along line 4—4 of FIG. 3;

FIG. 5 is an enlarged section of FIG. 4;

FIG. 6 is a plan view of a portion of the gasket assembly of FIG. 1 prior to the completion of the forming of the armor about the periphery of the combustion opening in the gasket assembly;

FIG. 7 is a cross-sectional view taken substantially along line 7—7 of FIG. 6; and FIG. 8 is a cross-sectional view similar to FIG. 7 with the auxiliary sealing means folded over.

DETAILED DESCRIPTION OF AN ILLUSTRATIVE EMBODIMENT

Figure 1:
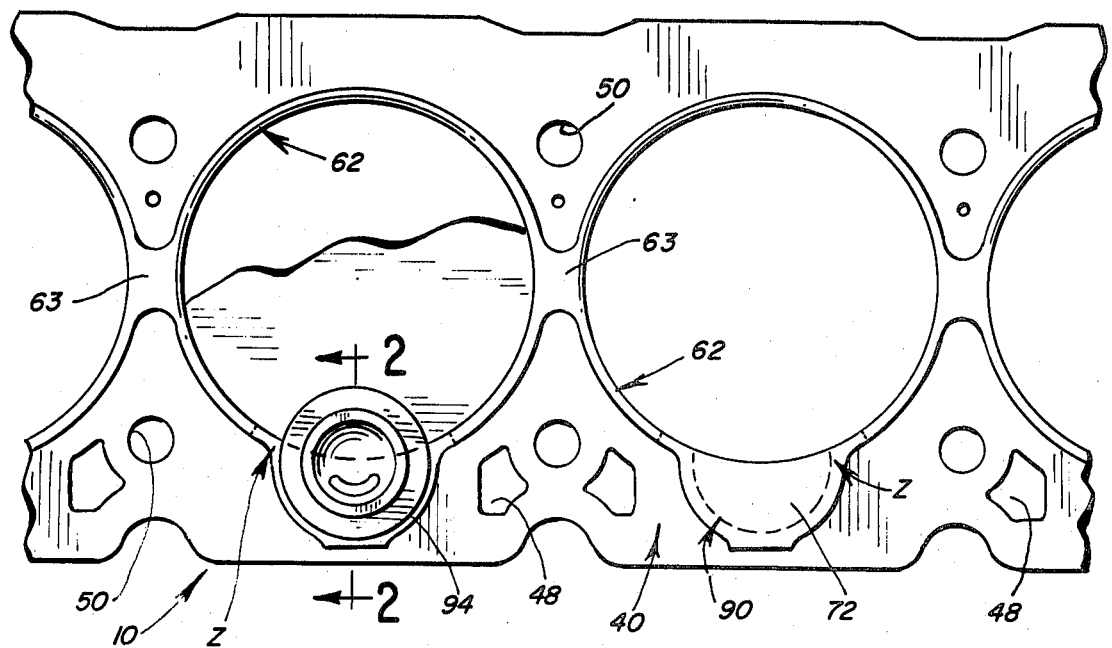
FIG. 1 is a partial plan view of a gasket assembly made in accordance with the present invention.
Figure 2:
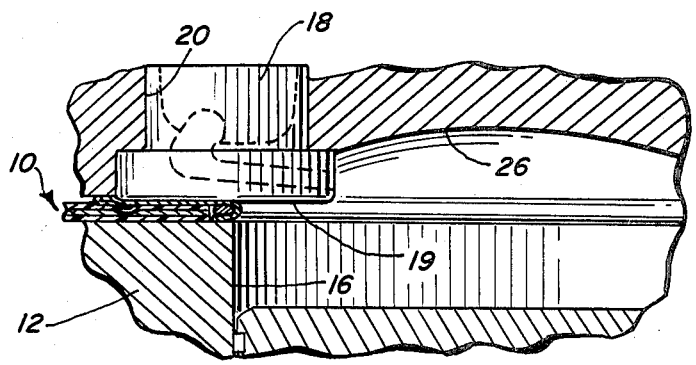
FIG. 2 is a sectional view of the gasket assembly of FIG. 1, positioned between a head and block of an internal combustion engine, taken substantially along line 2—2 of FIG. 1.

Referring first to FIGS. 1 and 2, a presently preferred diesel head gasket assembly 10 of this invention is shown. Assembly 10 is adapted and proportioned to cooperate with an engine block 12 and an engine head 14.

Block 12 defines a plurality of apertures including a plurality of combustion cylinders or chambers 16 and a plurality of oil and water bores (not shown). Head 14 defines a combustion chamber portion 26 overlying each chamber 16, and further defines a plurality of oil and water bores (not shown) which are aligned with complementary aligned bore in the block. Threaded bolts (not shown) connect the head and block and serve as the means for torquing and compressing gasket assembly 10 into sealing engagement with the block and head around the apertures therein.

As seen, the gasket assembly 10 comprises a main gasket body 40, which body is a heat-sensitive multi-layer assemblage. Body 40 comprises a central core or layer 42 which may be a metal sheet. Each side of central layer 42 is provided with a sealing layer or sheet 46 of impregnated asbestos. A conventional temperature, oil and water resistant impregnant may be used. The core 42 and sheets 46 are superposed with each other and are laminated with adhesive to hold the sheets together in a known manner.

Thereafter suitably positioned and proportioned apertures and openings are formed, as by punching. These openings and apertures include oil and water apertures 48 which are proportioned and positioned to surround the confronting ported ends of block and head oil and water bores. Apertures 48 permit flow communication between those bores and sealingly prevent leakage of fluid beyond the apertures 48. Bolt holes 50 are also provided in the body 40 to accommodate passage of bolts through head 14 and into threaded engagement with cooperating threaded holes in the block 12.

Finally, the gasket assembly 10 defines a plurality of apertures which surround the cylinder bores, adjacent which apertures the cylinders are designed to be sealed from the surrounding portions of the gasket assembly. To that end, the main gasket body 40 defines a plurality of clear through combustion openings 60 which, in the embodiment illustrated, are generally circular. A second gasket, a fire ring 62, is provided within the periphery defined by each of these combustion openings.

Fire ring 62 comprises a generally U-shaped metallic armor or annulus having a pair of legs 66 lying generally parallel to the main gasket body 40. For convenience, the several annuli may interconnect via connection webs 63. Each annulus is closed inwardly of the combustion opening and, as seen in the drawings, opens outwardly of the combustion opening 60. A wire ring 68 is disposed and ensheathed within the armor or annulus and, in the embodiment illustrated, comprises a butt-welded ring which initially is substantially circular in cross-section. The annulus may be formed of stainless steel of a thickness of about 0.006 inch and the ring 68 may be of an annealed soft steel of a diameter of about 0.041 inch.

Figure 3:
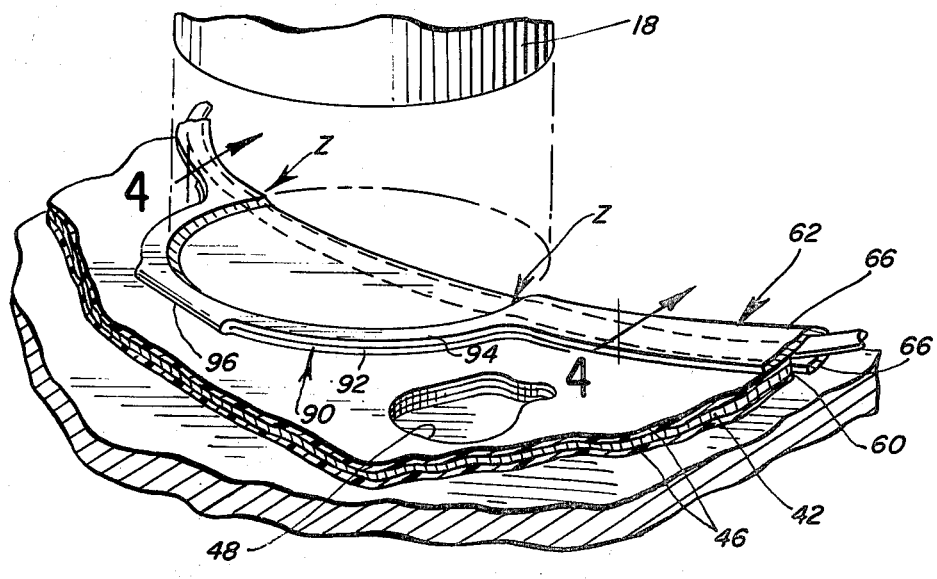
FIG. 3 is an exploded partial perspective view of a section of FIG. 2 after disassembly of the gasket assembly from the engine.

Suspending tongues, such as those described and illustrated in U.S. Pat. No. 3,565,449, may be formed with the annulus 64. Such tongues extend to and beyond the periphery of the combustion opening 60 and serve to suspend and position the fire ring 62 in the combustion opening 60 in the main gasket body 40. Such tongues may be used on both legs or may be used on one leg of the annulus, and a full overlap may be used on the upper side, as is illustrated in FIG. 3. Alternatively, a fully overlapping fire ring may be used to mount the fire ring on both sides at the periphery of the combustion opening in the main gasket body 40.

The fire ring 62 also provides a precombustion tab 72. Tab 72 is integrally formed with the annulus and is a continuation of one of the legs 66. As shown in the drawings, precombustion tab 72 is sufficiently expansive so that it underlies the precombustion chamber 18 to support the chamber 18 against displacement and to protect the main gasket body 40 from chamber 18. Precombustion chamber 18 is disposed within a suitably configured, stepped bore 20 in the head. The precombustion chamber serves to introduce fuel into the combustion chamber 16 in a known manner.

Although head gasket assemblies 10 comprising a main gasket body 40 and a fire ring 62 have been known and used for some time with eminently satisfactory results in sealing the head and block of engines, too frequently, when a precombustion chamber and precombustion tab are used, as is the case with diesel engines, especially those used for domestic rather than commercial service, failures arising from inadequate sealing have resulted. It has been discovered that such failures frequently occur at the zones of intersection of the precombustion chamber periphery and the fire ring, generally at the locations indicated as zones Z in FIG. 1, and around the precombustion chamber, hence, around the pre-cup tab. It has been determined that leakage occurs in part because the pre-cup and head are frequently not flush, i.e., in some cases the lower surface 19 projects beyond the adjacent head surface and in some cases it is recessed above the adjacent surface of the head. The steps produced by the stepped, non-flush conditions tend to define paths from the combustion chamber outwardly of the fire ring. Improved sealing thereat has been provided in accordance with the teachings of U.S. Pat. No. 4,311,318.

In accordance with the present invention, further improvements in sealing against combustion gas leakage and blow-by are provided. To that end, an auxiliary sealing element 90 is provided to underlie the precombustion tab (pre-cup tab). The element 90 comprises a curved main body portion 92 which underlies and is complementary to the curvature of the peripheral edge 94 of the pre-cup tab. Tab 72 and element 90 are preferably integral and joined, as by a hinge section or joining segment 96.

Each end of the main body portion 92 comprises a sealing tab 98 which, with the main body portion, bridges the adjacent zone of the intersection Z. Tabs 98 are proportioned generally to conform in shape to the leg 66 of the armor which it confronts and against which it is disposed.

As shown in the drawings, the auxiliary sealing element lies against the lower surface of the pre-cup tab and is integral therewith. The tabs 98, as well as the main body portion 92 are integrally formed with a leg 66 and are reversely folded to overlie the main gasket body 40 and wire ring 68, respectively, thereby to provide both an effective seal of the zones of intersection, and also an auxiliary seal around the pre-cup tab, thereby to minimize the possibility of combustion gas leakage from combustion openings past the periphery of the pre-cup tab.

To form the annulus and pre-cup tab of this invention, one of the legs 66 of the annulus may initially be provided with a pre-cup tab 72 and an integral auxiliary sealing element joined thereto by joining element 96 (see FIG. 6). The joining element is then folded to the position shown in FIG. 7 and at which it is ready to be provided with a wire ring 68 and to be closed about the edge of a combustion opening to conform to the finished assembly, typically shown in FIGS. 3 and 5. Thereafter, if desired, the fire ring 62 may be pre-compressed, as in the zones Z of the sealing tabs 98, thereby locally to reduce the thickness of the wire ring 68 in those zones, all prior to assembly of the head gasket assembly 10 between the block and the head (and associated combustion chambers) of an internal combustion engine.

When the head gasket assembly is so assembled with an internal combustion engine under load to seal the assembly and, for example, the precombustion chamber 18 is protecting as is illustrated by FIGS. 2-5, the precombustion chamber 18 tends to indent the precombustion tab 72. That is shown in exaggerated form for illustrative purposes in FIGS. 3, 4 and 5. In connection therewith, when, as shown, the precombustion chamber periphery bears against the precombustion tab in a zone which overlies the auxiliary sealing element, the auxiliary sealing element 90 tends to exert a somewhat greater force around the pre-cup tab, as well as in the zones of intersection Z, than would the fire ring assembly 62 absent the auxiliary sealing element 90. As such, the wire ring tends to force the armor of the legs 66 and precombustion tab 72 into closer conformity and sealing engagement with the precombustion chamber 18 and the head 14 at their zones of intersections Z and around the pre-cup tab. The greater localized force applied provides an effective and consistent seal, unlike comparable structures without an auxiliary sealing element, However, the increased load required in those zones does not significantly alter the load distribution on the gasket assembly 10 and therefore does not require additional load to effect seals adjacent the combustion opening, across the main body of the gasket, at the zones of intersection between the precombustion chamber and fire ring 62, and around the precombustion tab.

It will be apparent from the foregoing description and drawings that modifications may be made without departing from the spirit and scope of this invention. For example, a non-integral auxiliary sealing element may be inserted in the indicated location with similar results. When a non-integral auxiliary sealing element is used, preferably the sealing tabs comprise an extension 98' which is bent or rolled over to be held firmly between the wire 68 and the closed end of the annulus, as is shown in dotted line in FIG. 5.

The present invention is not to be considered to be limited to the specific embodiment illustrated, except insofar as may be required by the following claims.

What is claimed is:

1. In a head gasket assembly for positioning between the head and block of an internal combustion engine and wherein said block defines a combustion cylinder and said head defines a bore in which a precombustion chamber is disposed, said precombustion chamber being positioned partially to overlie said combustion cylinder and to discharge into said combustion cylinder, said head gasket assembly comprising a multi-layered main gasket body defining a combustion opening adapted to be disposed in-line with a said cylinder and defining a plurality of other apertures spaced away from said combustion opening, a fire ring secured to said body adjacent the periphery of said combustion opening and comprising a metallic annulus having legs lying generally parallel to said main gasket body, a wire ring disposed between said legs and within the periphery of said combustion opening and a precombustion tab extending from one of said legs outwardly of said combustion opening and being adapted to underlie and support a precombustion chamber so that the precombustion chamber partially overlies said combustion opening, said precombustion chamber being adapted to overlie and to intersect said wire ring at two spaced zones of intersection, the improvement comprising an auxiliary sealing element underlyig the precombustion tab and overlying said wire ring, said auxiliary sealing element comprising a main body portion generally complementary to the peripheral edge of the precombustion tab and lying against the lower surface thereof, and having integral sealing tabs, one of the sealing tabs underlying one of said legs at a first of said two spaced zones of intersection, and the other sealing tab underlying said leg at the second zone of intersection, whereby when said gasket assembly is disposed between a said head and block and is placed under load, a more effective and consistent seal between the fire ring and the associated precombustion tab around and adjacent said precombustion tab and an engine head and a precombustion chamber will be obtained.

2. In a head gasket assembly in accordance with claim 1, wherein said auxiliary sealing element is integrally formed with said precombustion tab and is reverse folded to underlie said precombustion tab and to overlie the wire ring.

3. In a head gasket assembly in accordance with claim 1 in which said gasket assembly is compressed in the spaced zones of intersection thereby locally to reduce the thickness of the wire ring prior to the positioning of the head gasket between a head and block of an internal combustion engine.

4. A sealed internal combustion engine assembly comprising a head, a block and a head gasket sealingly positioned therebetween, said block defining a combustion cylinder and said head defining a bore in which a precombustion chamber is disposed, said precombustion chamber partially overlying said combustion cylinder to discharge into said combustion cylinder, said head gasket assembly comprising a main gasket body defining a combustion opening disposed in-line with said cylinder and defining a plurality of other apertures spaced away from said combustion opening, and a fire ring secured to said body adjacent the periphery of said combustion opening, said fire ring comprising a metallic annulus having legs lying generally parallel to said main gasket body, a wire ring disposed between said legs and within the periphery of said combustion opening, and a precombustion tab extending from one of said legs outwardly of said combustion opening and underlying and supporting said precombustion chamber, said precombustion chamber overlying and intersecting said wire ring at two spaced zones of intersection, and an auxiliary sealing element underlying precombustion tab and overlying said wire ring, said auxiliary sealing element comprising a main body portion lying along the edge of the precombustion tab and lying against the lower surface thereof, and having integral sealing tabs, one of said tabs bridging one of said zones of intersection, the other tab bridging the other zone of intersection, whereby said gasket assembly provides a more effective and consistent seal between the fire ring adjacent the precombustion tab and the head and the precombustion chamber, thereby to prevent blow-by of gases from said combustion cylinder.

5. The sealed internal combustion engine assembly in accordance with claim 4 in which said auxiliary sealing element is integrally formed with the precombustion tab and is reverse-folded to underlie the precombustion tab.

6. The sealed internal combustion engine assembly in accordance with claim 4 in which said precombustion chamber periphery bears against said precombustion tab over said auxiliary sealing element.

* * * * *